(12) United States Patent
Zornio et al.

(10) Patent No.: US 8,606,378 B2
(45) Date of Patent: Dec. 10, 2013

(54) METHODS, APPARATUS, AND ARTICLES OF MANUFACTURE TO IDENTIFY HAZARDOUS PROCESS CONDITIONS ASSOCIATED WITH DEVICES IN A PROCESS CONTROL SYSTEM

(75) Inventors: Peter Zornio, Austin, TX (US); Duncan Trevor Schleiss, Austin, TX (US); Andre Arthur Dicaire, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 240 days.

(21) Appl. No.: 12/891,369

(22) Filed: Sep. 27, 2010

(65) Prior Publication Data

US 2012/0078391 A1  Mar. 29, 2012

(51) Int. Cl.
*G05B 9/02* (2006.01)

(52) U.S. Cl.
USPC .............. 700/80; 700/9; 700/20; 700/21

(58) Field of Classification Search
USPC .................... 700/2, 9, 12, 20, 21, 79, 80
See application file for complete search history.

(56) References Cited

U.S. PATENT DOCUMENTS

| | | | |
|---|---|---|---|
| 4,298,955 A | 11/1981 | Munday et al. | |
| 6,611,208 B1 | 8/2003 | Ketler | |
| 6,789,205 B1 * | 9/2004 | Patino et al. | 713/300 |
| 7,050,944 B2 * | 5/2006 | Evans | 702/188 |
| 2005/0068710 A1 * | 3/2005 | Burr et al. | 361/119 |
| 2009/0157839 A1 * | 6/2009 | Diederichs et al. | 709/208 |

FOREIGN PATENT DOCUMENTS

| | | |
|---|---|---|
| EP | 0592921 | 4/1994 |
| EP | 0906629 | 12/1997 |
| GB | 2274540 | 7/1994 |

OTHER PUBLICATIONS

Rannells, John H., "Practical Considerations of Area Classification: How Far to Classify", IEEE Industry Applications Magazine, May/Jun. 1996.*

Intellectual property Office, "International Search Report", issued in connection with Great Britain Application No. GB1115640.3, Jan. 10, 2012, (2 pages).

MTL Instruments, "A Users Guide to Intrinsic Safety," Application Note AN9003, Aug. 2006, Oct. 2006, and Mar. 2007, Bedfordshire, England (20 pages).

* cited by examiner

*Primary Examiner* — Carlos Ortiz Rodriguez
(74) *Attorney, Agent, or Firm* — Hanley, Flight & Zimmerman, LLC (57) ABSTRACT

An example method to identify a hazardous process control type associated with a process control device includes automatically detecting that a process control device is coupled to a port on a controller, detecting information associated with the process control device via the port, identifying a hazardous process condition type of the process control device based on the detected information, and sending information to a computing device to cause a display to include visual indication of the identified hazardous process condition type in association with the process control device.

16 Claims, 6 Drawing Sheets

METHODS, APPARATUS, AND ARTICLES OF MANUFACTURE TO IDENTIFY HAZARDOUS PROCESS CONDITIONS ASSOCIATED WITH DEVICES IN A PROCESS CONTROL SYSTEM

FIELD OF THE DISCLOSURE

The disclosure relates generally to process control systems and, more particularly, to methods, apparatus, and articles of manufacture to identify hazardous process conditions associated with devices a process control system.

BACKGROUND

Process control systems, like those used in chemical, petroleum, pharmaceutical, pulp and paper, and/or other manufacturing processes, typically include one or more process controllers communicatively coupled to at least one host (e.g., an operator workstation) and to one or more process control devices (e.g., field devices) configured to communicate via analog, digital or combined analog/digital communication signals and/or protocols. The field devices, which may be, for example, device controllers, valves, valve actuators, valve positioners, switches, transmitters (e.g., temperature, pressure, flow rate, and chemical composition sensors) and/or any combinations thereof, perform functions within the process control system such as opening and/or closing valves and measuring and/or inferring process parameters. A process controller receives signals indicative of process measurements made by the field devices and/or other information pertaining to the field devices, uses this information to implement a control routine, and generates control signals that are sent over buses and/or other communication lines to the field devices to control the operation of the process control system.

Information from the field devices and/or the process controller(s) is usually made available over a data highway and/or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process(es) of a process plant, such as changing settings of the process control routine(s), modifying the operation of the control modules within the process controllers and/or the field devices, viewing the current state of the process(es), viewing alarms generated by field devices and/or controllers, simulating the operation of the process(es) for the purpose of training personnel and/or testing the process control software, maintaining and/or updating a configuration database, etc.

SUMMARY

Methods, apparatus, and articles of manufacture to automatically identify intrinsically safe devices in a process control system are disclosed. Some example methods to identify a hazardous process control type associated with a process control device include automatically detecting that a process control device is coupled to a port on a controller, detecting information associated with the process control device via the port, identifying a hazardous process condition type of the process control device based on the detected information, and sending information to a computing device to cause a display to include a visual indication of the identified hazardous process condition type in association with the process control device.

Some example process control apparatus include an input/output (I/O) port, a process control device detector coupled to the I/O port to detect that a process control device is coupled to the I/O port, an I/O processor to communicate with a process control system based on information received from the device, and a hazardous process condition signal modifier to modify a communication between the I/O processor and the process control system to include an indication that the process control device is associated with a hazardous process condition.

DETAILED DESCRIPTION

Although the following discloses example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

Intrinsic safety refers to equipment and wiring that is inherently safe for use in a hazardous area. In other words, an intrinsically safe system is one with energy levels so low they cannot cause an explosion. The terms "hazardous area" and "hazardous location" refer to any location with combustible material such as gases, dusts, or fibers that might produce an ignitable mixture, a radioactive area, an area containing dangerous biological material, an area containing dangerous chemical material, or the like. A hazardous area can be, for example, a sealed room filled with a volatile material or an area that is open to normal foot traffic, such as the area around a gasoline pump. In North America, hazardous areas are usually designated by classes, divisions, and groups, although the international system of zones and groups is becoming increasingly popular. Intrinsic safety is typically achieved through the use of barriers such as zener diode barriers or isolated barriers that limit energy provided to a device in a hazardous area.

The example methods, apparatus, and articles of manufacture described herein may be used to identify process control devices in a process control system located in a hazardous area to users of a process control system. The example methods, apparatus, and articles of manufacture may further display an indication to a user of the process control system whether a process control device is intrinsically safe. By identifying intrinsically safe devices to a user, the example methods, apparatus, and articles of manufacture increase the safety of the process environment because the user is alerted to take special precautions when working on an intrinsically safe system that is located in a potentially hazardous area.

While some examples described below refer to intrinsic safety and/or intrinsically safe devices, which are typically associated with potentially explosive conditions, the examples are equally applicable to other types of hazardous process conditions. Hazardous process conditions may include, but are not limited to, radioactivity, biological hazards, chemical hazards, or the like.

In many known process control systems, users are not alerted that a process control device is in a hazardous area until the user physically travels to the process control device or a termination area. In contrast to known systems, the example methods, apparatus, and articles of manufacture described herein notify users of a hazardous environment when the user observes the process control device as represented on an operator interface. Thus, the user may determine and observe safe procedures prior to approaching a work area associated with that hazardous environment.

In some examples, an input/output (I/O) card detects that a process control device (e.g., a field device) is coupled to an I/O port. The I/O card may determine that the process control device is an intrinsically safe (IS) device. Field devices that are placed in hazardous locations (e.g., locations that have a potentially explosive atmosphere) are required by some safety standards to be IS devices that are incapable of igniting the atmosphere. Based on determining whether the process control device is intrinsically safe, the I/O card may modify one or more data signals sent to a process control workstation or operator interface to indicate that the process control device is intrinsically safe and, thus, is in a hazardous location. In response to the notification, the workstation identifies the process control device as intrinsically safe to any users that observe an operator interface located on, for example, a workstation. In some examples, the operator interface highlights IS devices using a blue-colored hue to represent the color traditionally associated with IS devices.

Figure 1:
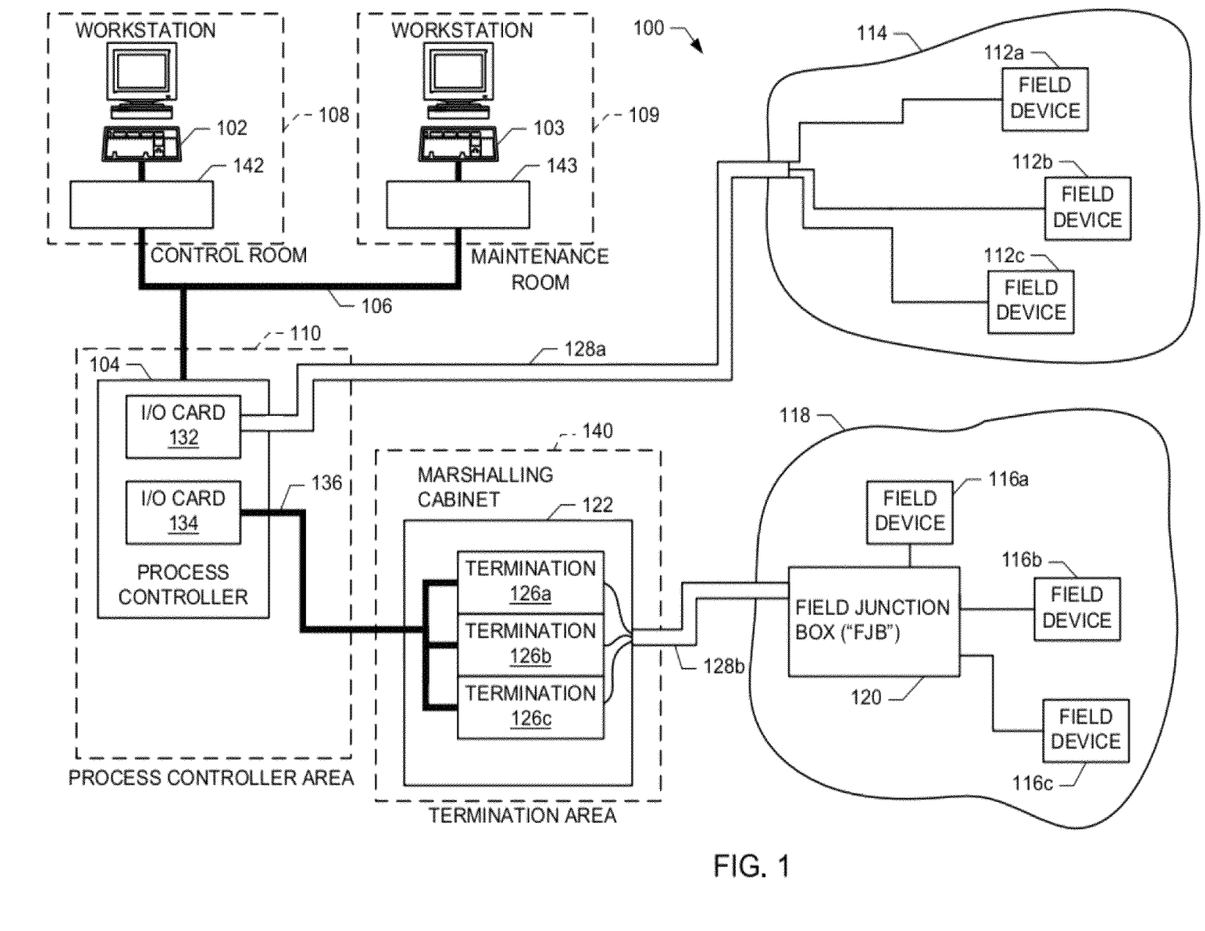
FIG. 1 is a block diagram showing an example process control system including workstations, a process controller, and an I/O card.

In FIG. 1, an example process control system 100 includes workstations 102 and 103 communicatively coupled to a controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstations 102 and 103 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP). Similarly, the workstation 103 may be configured to provide maintenance personnel with information regarding the system 100.

The controller 104 may be configured to perform one or more process control routines or functions that have been generated by a system engineer or other system operator using, for example, the workstation 102 or any other workstation and which have been downloaded to and instantiated in the controller 104. In the illustrated example, the workstation 102 is located in a control room 108, the workstation 103 is located in a maintenance room 109, and the controller 104 is located in a process controller area 110 separate from the control room 108.

In the illustrated example, the example process control system 100 includes process control devices 112a, 112b, and 112c in a first process area 114 and process control devices 116a, 116b, and 116c in a second process control area 118. A field junction box (FJB) 120 routes signals from the process control devices 116a-116c to a marshalling cabinet 122 in a termination area 140. To route information associated with the process control devices 116a-116c in the marshalling cabinet 122, the marshalling cabinet 122 is provided with the plurality of termination modules 126a, 126b, and 126c. The termination modules 126a-126c are configured to marshal information associated with the process control devices 116a-116c in the second process area 118.

The illustrated example of FIG. 1 depicts a point-to-point configuration in which each conductor or conductor pair (e.g., bus, twisted pair communication medium, two-wire communication medium, etc.) in multi-conductor cables 128a and 128b (e.g., communication paths) communicates information uniquely associated with a respective one of the process control devices 112a-112c and 116a-116c. In the depicted example implementation, the multi-conductor cable 128a communicatively couples the process control devices 112a-112c directly to an I/O card 132 and the multi-conductor cable 128b communicatively couples the process control devices 116a-116c to an I/O card 134 via the respective termination modules 126a-126c and the FJB 120. The marshalling cabinet 122 marshals (e.g., organizes, groups, etc) information received from the FJB 120 and routes the process control device information to the I/O card 134 of the controller 104. In an alternative example implementation in which the marshalling cabinet 122 is omitted, the termination modules 126a-126c can be installed in the FJB 120.

The process control devices 112a-112c and 116a-116c may be Fieldbus-compliant valves, actuators, sensors, etc., in which case the process control devices 112a-112c and 116a-116c communicate via a digital data bus using the well-known Fieldbus communication protocol. Of course, other types of process control devices and communication protocols could be used instead. For example, the process control devices 112a-112c and 116a-116c could instead be Profibus®, HART™, or AS-i compliant devices that communicate via the data bus using the well-known Profibus® and HART™ communication protocols. In some example implementations, the process control devices 112a-112c and 116a-116c can communicate information using analog communications or discrete communications instead of digital communications. In addition, the communication protocols can be used to communicate information associated with different data types.

In the illustrated example, the I/O card 132 is configured to control I/O communications between the controller 104 (and/or the workstation 102) and the process control devices 112a-112c in the first process area 114. Additionally, the I/O card 134 is configured to control I/O communications between the controller 104 (and/or the workstation 102) and the process control devices 116a-116c in the second process area 118. The I/O cards 132 and 134 may include one or more I/O channels (and/or a characterization module (CHARM) that converts digital bus data into an appropriate communication protocol for a process control device) that interface with the respective process control devices 112a-112c and 116a-116c. I/O channels are partitions of an I/O card (e.g., a CHARM I/O card (CIOC)) that enable an I/O card to be communicatively coupled to many process control devices with different communication protocols. I/O channels also provide organization to an I/O card by having a defined static interface to a process control device that the I/O card can consistently utilize to route communications to the process control device.

To enable communications between the termination modules 126a-126c and the I/O card 134, the termination modules 126a-126c are communicatively coupled to the I/O card 134 via a universal I/O bus 136. Unlike the multi-conductor cables 128a and 128b, which use separate conductors or communication mediums for each one of the process control devices 112a-112c and 116a-116c, the universal I/O bus 136 is configured to communicate information corresponding to a plurality of process control devices (e.g., the process control devices 116a-116c) using the same communication medium.

In the illustrated example, the process area 114 is considered a hazardous location. Hazardous locations may include those locations where, for example, a potentially explosive atmosphere is present. Types of hazardous locations are grouped by the type of combustible airborne material that is present (e.g., acetylene, propane, grain dust, etc.). Some process control devices can potentially store enough energy to create an ignition source (e.g., a spark), which can cause the combustible material in the hazardous location to ignite and/or explode. Thus, a class of process control devices called "intrinsically safe" devices, which are energy-limited to reduce or prevent the risk of an explosion in a hazardous area, are used within the process area 114. The example field devices 112a, 112b, and 112c are intrinsically safe devices. The example I/O card 132 identifies the field devices 112a-112c as intrinsically safe as described in more detail below. When the I/O card 132 detects that a field device 112a is intrinsically safe, the I/O card 132 may modify a signal to include an indication that the field device 112a is intrinsically safe. The I/O card 132 may provide the modified signal(s) to the workstations 102 and 103 via respective hazardous process condition signal detectors 142 and 143. As described in further detail below, the hazardous process condition signal detectors 142 and 143 may cause the workstations 102 and 103 to display a visual indication of a hazardous process condition associated with the field devices 112a-112c.

Figure 2:
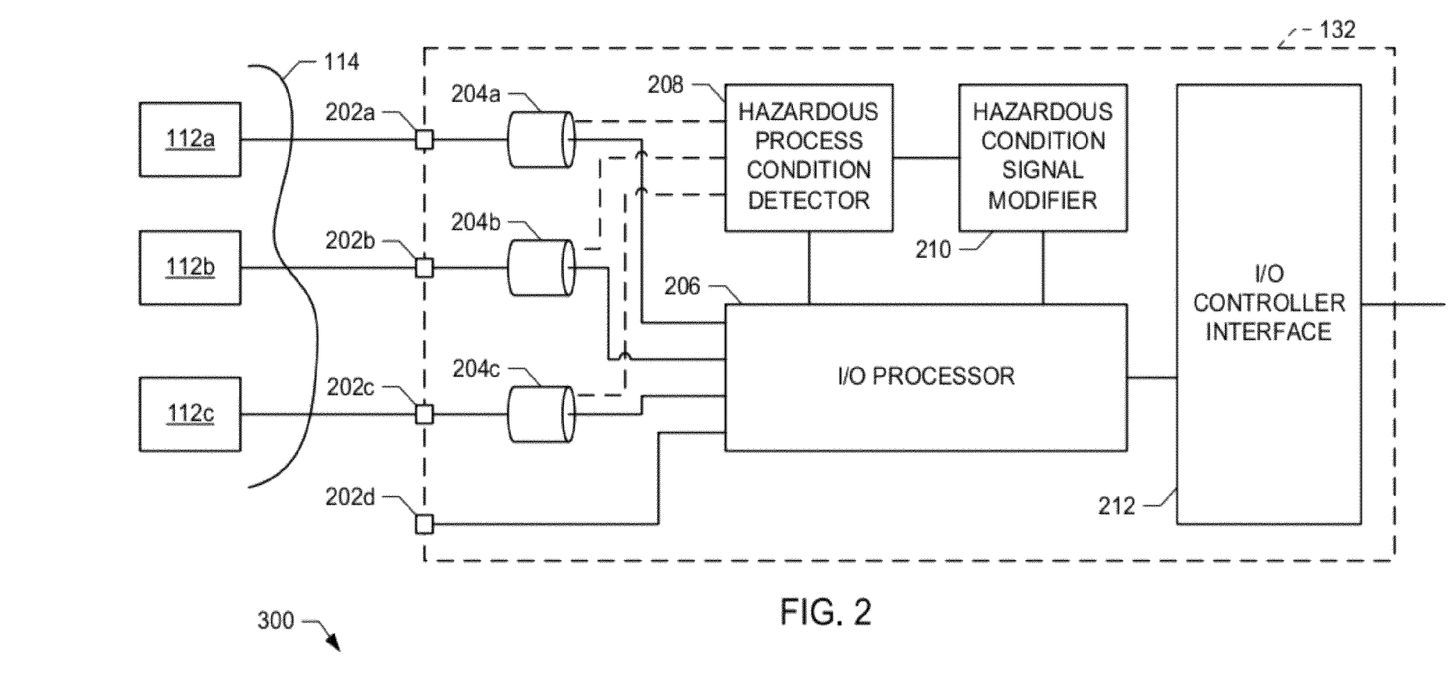
FIG. 2 is a more detailed block diagram of the example I/O card of FIG. 1.

FIG. 2 is a more detailed block diagram of the example I/O card 132 of FIG. 1. The I/O card 132 is coupled to the example IS field devices 112a-112c to receive and/or transmit process control data and/or commands. The I/O card 132 is further coupled to the workstations 102 and 103 via the LAN 106. The I/O card 132 of FIG. 2 includes terminations 202a, 202b, 202c, and 202d and IS bathers 204a, 204b, and 204c. The example I/O card 132 further includes an I/O processor 206, a hazardous process condition detector 208, a hazardous condition signal modifier 210, and an I/O controller interface 212.

The terminations 202a-202c are physical terminations to couple the I/O card 132 to respective ones of the IS field devices 112a-112c. Likewise, the termination 202d may couple the I/O card 132 to a non-IS field device. The IS barriers 204a-204c limit the energy that may be provided to the IS field devices 202a-202c located within the hazardous process area 114 to non-incendiary levels while allowing data to be transferred between the IS field devices 112a-112c and the I/O processor 206. The IS barriers 204a-204c may be added or removed as needed to protect the IS field devices 112a-112c or to connect non-IS field devices (e.g., the field devices 116a-116c of FIG. 1) to the I/O card 132.

The I/O processor 206 receives data from the IS field devices 112a-112c and transmits the data via the I/O controller interface 212. The I/O controller interface 212 enables communication between the I/O card 132 (e.g., the I/O processor 206) and the controller 104 to which the I/O card 132 is coupled. The controller 104 may then transmit the data (e.g., via the LAN 106) to, for example, the workstations 102 and 103, a data historian system, other controllers, and/or any other devices on the LAN 106. The example IS field devices 112a-112c transmit the data using analog, discrete and/or digital signals. When the I/O processor 206 receives analog data, the I/O processor 206 may convert (e.g., sample) the analog data to generate digital representations of those values. The discrete data values may have different degrees of confidence based on, for example, the quality (e.g., signal-to-noise ratio) of the signal. Thus, the I/O processor 206 also generates a status value to be associated with the data value to indicate how reliable the data value may be.

The hazardous process condition detector 208 detects whether a field device (e.g., the IS field devices 112a-112c) has an associated hazardous process condition, such as an explosive atmosphere, to be identified to a user of the process control system 100. For example, the hazardous process condition detector 208 may detect that a field device is an IS field device by monitoring the IS barriers 204a-204c for connected devices. Because non-IS field devices may not work properly when connected to an IS barrier 204a and the IS bathers 204a-204c represent an additional expense, the IS barriers 204a-204c are typically not used unless an IS field device 112a-112c is coupled to the I/O card 132. Thus, by detecting the presence of the IS barrier 204a-204c, the hazardous process condition detector 208 may detect that the IS field devices 112a-112c are intrinsically safe. Based on the detection, the hazardous process condition detector 208 may notify or signal to the I/O processor 206 and/or the hazardous condition signal modifier 210 which of the terminations 202a-202d (e.g., signals, channels) are coupled to the IS field devices 112a-112c.

Additionally or alternatively, field devices may be identified as located in other types of hazardous process conditions (e.g., radioactive, chemical hazard, biological hazard, etc.) by including an appropriate sensor proximate to the respective field device. For example, the IS barrier 204a connected in series with the field device 112a may be replaced with a radioactivity sensor that generates a signal based on the radioactivity of the location in which the field device 112a is located. The example hazardous process condition detector 208 may then receive a radioactivity signal and determine whether a hazardous radioactivity condition exists at the field device 112a.

Figure 3:
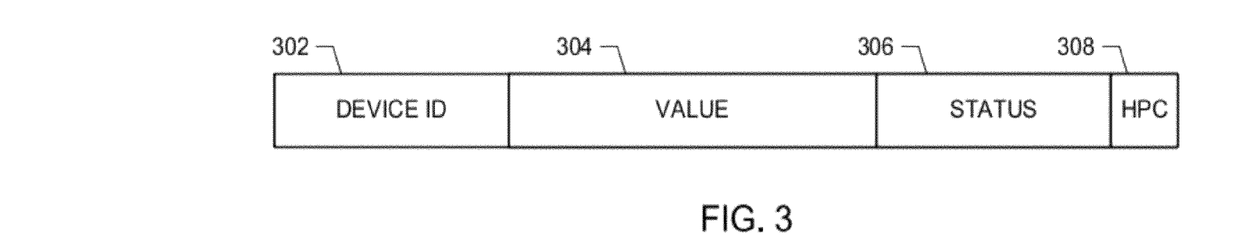
FIG. 3 illustrates an example data packet that may be generated by the I/O card of FIG. 2.

The hazardous condition signal modifier 210 receives the detection and/or the identification of the terminations 202a-202d to which the IS field devices 112a-112c are coupled. Based on the identifications, the hazardous condition signal modifier 210 causes the I/O processor 206 to add a hazardous process condition identifier to data signals corresponding to data received from the IS field devices 112a-112c. An example data packet 300 generated by the I/O processor 206 is illustrated in FIG. 3. The I/O processor 206 receives data (e.g., an analog signal representative of process control information) from a field device (e.g., the IS field device 112a) and samples the data to generate a discrete representation. The I/O processor 206 generates the data packet 300 for presentation of system data to a system user and/or for data storage. The example data packet 300 includes an indication of the origination of the data signal, such as an identification of the field device 112a (DEVICE ID) 302. A data value field 304 (VALUE) is the discrete representation of the data received from an IS field device 112a. Additionally, the I/O processor 206 determines a quality status (STATUS) 306 of the VALUE 304.

Based on an IS detection signal from the hazardous process condition detector 208 indicating that the IS field device 112a is intrinsically safe, the example I/O processor 206 modifies the data packet to include an indication that the IS field device 112a is intrinsically safe. For example, the I/O processor 206 may add a hazardous process condition field or property (HPC) 308 (e.g., an IS condition field) to the data packet 300. If the I/O processor 206 does not receive an IS detection signal or if the IS detection signal indicates that a field device is not associated with a hazardous process condition, the I/O processor 206 may omit the HPC field 308 or may provide an HPC field 308 that indicates that the field device is not associated with a hazardous process condition.

In some examples, an HPC field 308 (e.g., containing an IS condition) may additionally include the type and/or classification of hazardous location which, in the example case of an IS condition, may be defined using the Class, Division, and Group classification and/or the Zone, Division classification. The type classification of a hazardous location may be determined by, for example, receiving an indication of an IS rating of the device and/or the IS barrier. The example data packet 300 may have additional fields such as headers to prepare it for transfer via the controller 104 and/or the LAN 106. After preparing the data packet 300, the I/O processor 206 transmits the data packet 300 via the LAN 106 to one or both of the workstations 102 and 103, where the data packet 300 may be used in a known process or as described below.

While FIG. 2 illustrates the example I/O processor 206, the example hazardous process condition detector 208, and the example hazardous condition signal modifier 210 as implemented in the I/O card 132, any one or more of the I/O processor 206, the hazardous process condition detector 208, and/or the hazardous condition signal modifier 210 may be implemented in the controller 104. Thus, the controller 104 may automatically detect that a process control device is coupled to a port on the I/O card, detect a signal associated with the device via the port identifying the device as intrinsically safe, and/or modify the signal to include an indication that the device is intrinsically safe. By including one or more of the I/O processor 206, the hazardous process condition detector 208, and/or the hazardous condition signal modifier 210, redundant functionality at the I/O cards 132 and 134 may be avoided, but the controller 104 is then responsible for detecting IS devices on a larger number of ports.

While the example I/O card 132 of FIG. 2 is illustrated as having terminations 202a-202c coupled directly to respective ones of the field devices 112a-112c, the example I/O card 132 may be modified to detect IS field devices coupled to the I/O card 132 via a universal bus (e.g., the universal bus 136 of FIG. 1). For example, the hazardous process condition detector 208 may receive an indication that a field device is associated with a hazardous process condition via the universal bus 136 from the FJB 120 and/or may detect the presence of IS barriers and/or hazardous process condition sensors at the FJB 120.

Returning to FIG. 1, the example workstations 102 and 103 are provided with hazardous process condition signal identifiers 142 and 143. The hazardous process condition signal identifiers 142 and 143 are coupled to the LAN 106 and receive the data packet 300 from the I/O card 132 and/or the controller 104. The hazardous process condition signal identifiers 142 and 143 identify a hazardous process condition property (e.g., the IS field 306) of the data packet 300 corresponding to a data signal received from a field device 112a-112c (e.g., when the I/O card 132 detects that a field device is intrinsically safe). However, if a data packet corresponding to a data signal from a field device does not have a hazardous process condition property (e.g., a data packet from the field devices 116a-116c and/or the I/O card 134), the hazardous process condition signal identifiers 142 and 143 may determine that the corresponding field device does not have an associated hazardous process condition.

When the hazardous process condition signal identifiers 142 and 143 detect the hazardous process condition property in a signal, the hazardous process condition signal identifiers 142 and 143 notify the respective workstations 102 and 103 that the device corresponding to the DEVICE ID 302 has an associated hazardous process condition and, thus, is located in a hazardous area. Conversely, if the hazardous process condition signal identifiers 142 and 143 do not detect the hazardous process condition property, the hazardous process condition signal identifiers 142 and 143 treat the device corresponding to the DEVICE ID 302 as located in a non-hazardous environment.

Whether the field device 112a is actually located in a hazardous area is irrelevant to the example hazardous process condition signal identifiers 142 and 143. For example, the hazardous process condition signal identifiers 142 and 143 may identify the IS field device 112a as located in a hazardous area based on the assumption that IS devices are only used in hazardous areas. While this assumption does not necessarily universally hold, the identification of an IS field device 112a as located in a hazardous area causes personnel who perform maintenance or other procedures on the IS field device 112a to practice safe procedures when working on the IS field device 112a, thereby increasing safety for personnel. However, in some examples the hazardous process condition identifiers 142 and 143 may be configured with a location and/or a hazardous area field to notify a user only of devices that are actually in hazardous areas.

The example workstations 102 and 103 receive the data packet 300 from the LAN 106 and/or from the respective hazardous process condition signal identifiers 142 and 143. In some examples, the hazardous process condition signal identifiers 142 and 143 are implemented as software instructions executed by a processor on the workstations 102 and 103. However, in some other examples, the hazardous process condition signal identifiers 142 and 143 may be implemented using other methods such as a standalone device or system, or may be implemented in another device communicatively coupled to the LAN 106 and the workstations 102 and 103.

Figure 4:
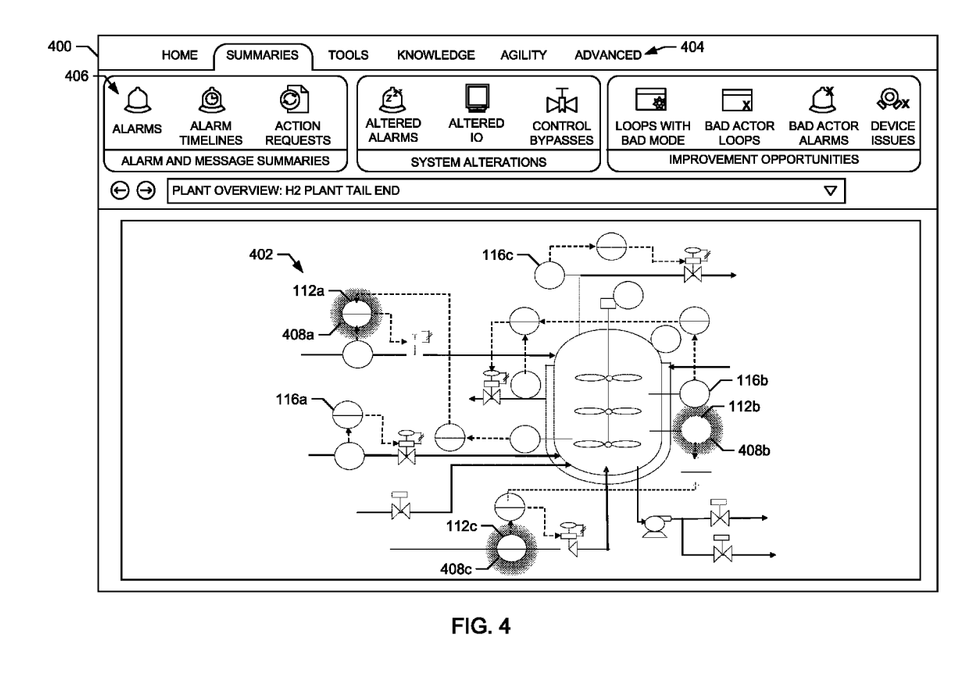
FIG. 4 is an example operator interface that may be displayed to an operator on the process control workstations illustrated in FIG. 1.

FIG. 4 is an example operator interface 400 that may be displayed to an operator on a process control workstation such as the workstations 102 and 103 illustrated in FIG. 1. The example operator interface 400 displays a representation of a process environment 402 including at least a portion of the example process control system 100, such as the field devices 112a-112c and 116a-116c. The example operator interface 400 may further include one or more menus 404, interface buttons 406, and/or other types of known user interface constructs.

When the workstations 102 and 103 receive the data packet 300 that includes the HPC field 308 (FIG. 3), the workstations 102 and 103 determine that the field device 112a is an intrinsically safe device and assume that the field device 112a is located in a hazardous location. Accordingly, when the workstations 102 and 103 display a representation of the field device 112a to an operator or other personnel, the workstations 102 and 103 also display a representation that the field device 112a is an intrinsically safe device. The representation may be accomplished by, for example, highlighting, coloring, or otherwise calling a user's attention to the fact that the field device 112a is an intrinsically safe device and, thus, should be treated as located in a potentially hazardous area.

In the example of FIG. 4, the operator interface 400 places a blue-colored hue (IS devices are associated with the color blue by standard), or highlight 408a, 408b, and 408c, around the field devices 112a-112c to visually represent the field devices 112a-112c as intrinsically safe. In examples where the HPC field 308 includes an identification of the type of hazardous location, the operator interface 400 may additionally display or make available for display the classification of the hazardous location. When a process control operator, maintenance worker, or other personnel observes the process environment 402, the personnel are alerted to the potentially hazardous process condition associated with the field devices 112a-112c and may make appropriate modifications to their tasks or preparations to observe safety precautions associated with working on the field devices 112a-112c.

In some examples, the highlights 408a-408c are presented to any and all personnel who observe the field devices 112a-112c on the operator interface 400. However, in some other examples, the highlights 408a-408c are ignored or not used by some workstations 102 and 103 that are not used by personnel with a potential need to know the hazardous process condition associated with the field device.

While the example intrinsically safe field devices 112a-112c are illustrated in FIG. 4 as having respective colored hues proximate to the visual representations of the field devices 112a-112c, the field devices 112a-112c and/or other field devices associated with hazardous process conditions different than an explosive atmosphere may have device symbols associated with other color(s), pattern(s), highlight(s), text, symbol(s), position(s) with respect to the corresponding field device(s), any other visual cue(s) or representation(s), and/or any combination(s) thereof. For example, a field device located in a potentially radioactive area may have a green highlight. A user of the process control system 100 (FIG. 1) may then be able to quickly visually distinguish different types of hazardous process conditions on the operator interface 400.

Figure 5:
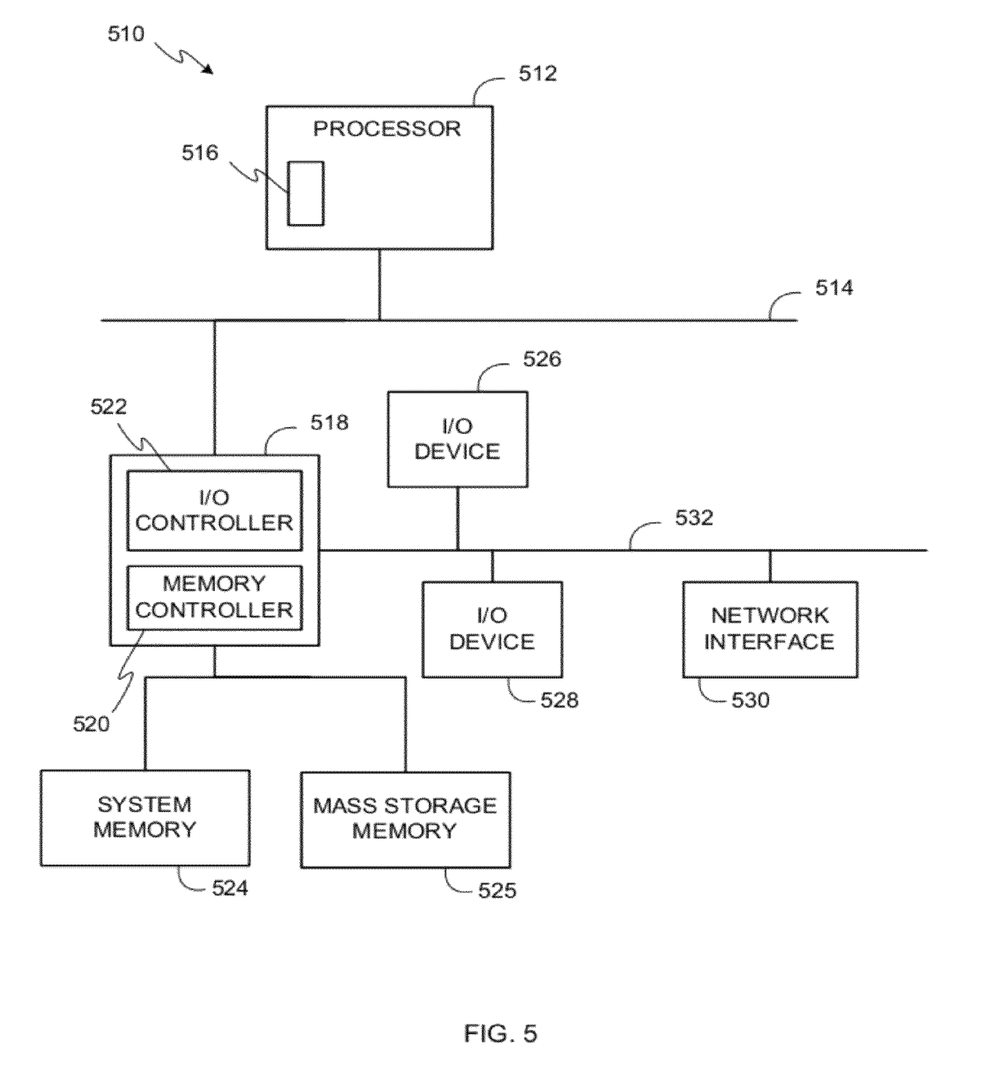
FIG. 5 is a block diagram of an example processor system that may be used to implement the example workstations of FIG. 1.

FIG. 5 is a block diagram of an example processor system 510 that may be used to implement the example workstations 102 and 103 of FIG. 1. As shown in FIG. 5, the processor system 510 includes the processor 512 that is coupled to an interconnection bus 514. The processor 512 includes a register set or register space 516, which is depicted in FIG. 5 as being entirely on-chip, but which could alternatively be located entirely or partially off-chip and directly coupled to the processor 512 via dedicated electrical connections and/or via the interconnection bus 514. The processor 512 may be any suitable processor, processing unit or microprocessor. Although not shown in FIG. 5, the system 510 may be a multi-processor system and, thus, may include one or more additional processors that are identical or similar to the processor 512 and that are communicatively coupled to the interconnection bus 514.

The processor 512 of FIG. 5 is coupled to a chipset 518, which includes a memory controller 520 and an input/output (I/O) controller 522. As is well known, a chipset typically provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The example operator interface 400 of FIG. 4 may be displayed to a process control system user via one of the I/O devices 526 or 528. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system.

While the memory controller 520 and the I/O controller 522 are depicted in FIG. 5 as separate functional blocks within the chipset 518, the functions performed by these blocks may be integrated within a single semiconductor circuit or may be implemented using two or more separate integrated circuits.

While example manners of implementing the example I/O card 132 of FIG. 1 has been illustrated in FIG. 2, one or more of the elements, processes and/or devices illustrated in FIG. 2 may be combined, divided, re-arranged, omitted, eliminated and/or implemented in any other way. Further, the example hazardous process condition signal identifiers 142 and 143, the example I/O processor 206, the example hazardous process condition detector 208, the example hazardous condition signal modifier 210, the example I/O controller interface 212 and/or, more generally, the example I/O card 132 of FIGS. 1 and 2 may be implemented by hardware, software, firmware and/or any combination of hardware, software and/or firmware. Thus, for example, any of the example hazardous process condition signal identifiers 142 and 143, the example I/O processor 206, the example hazardous process condition detector 208, the example hazardous condition signal modifier 210, the example I/O controller interface 212 and/or, more generally, the example I/O card 132 of FIGS. 1 and 2 could be implemented by one or more circuit(s), programmable processor(s), application specific integrated circuit(s) (ASIC(s)), programmable logic device(s) (PLD(s)) and/or field programmable logic device(s) (FPLD(s)), etc.

As used herein, the term tangible computer readable medium is expressly defined to include any type of computer readable storage and to exclude propagating signals. Additionally or alternatively, the example processes of FIGS. 6 and 7 described in detail below may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. When any of the appended apparatus claims are read to cover a purely software and/or firmware implementation, at least one of the example hazardous process condition identifiers 142 and 143, the example I/O processor 206, the example hazardous process condition signal device detector 208, the example hazardous condition signal modifier 210, and/or the example I/O controller interface 212 of FIGS. 1 and 2 are hereby expressly defined to include a tangible medium such as a memory, DVD, CD, etc. storing the software and/or firmware. Further still, the example hazardous process condition signal identifiers 142 and 143, the example I/O processor 206, the example hazardous process condition detector 208, the example hazardous condition signal modifier 210, the example I/O controller interface 212 and/or, more generally, the example I/O card 132 of FIGS. 1 and 2 may include one or more elements, processes and/or devices in addition to, or instead of, those illustrated in FIGS. 1 and 2, and/or may include more than one of any or all of the illustrated elements, processes and devices.

Figure 6:
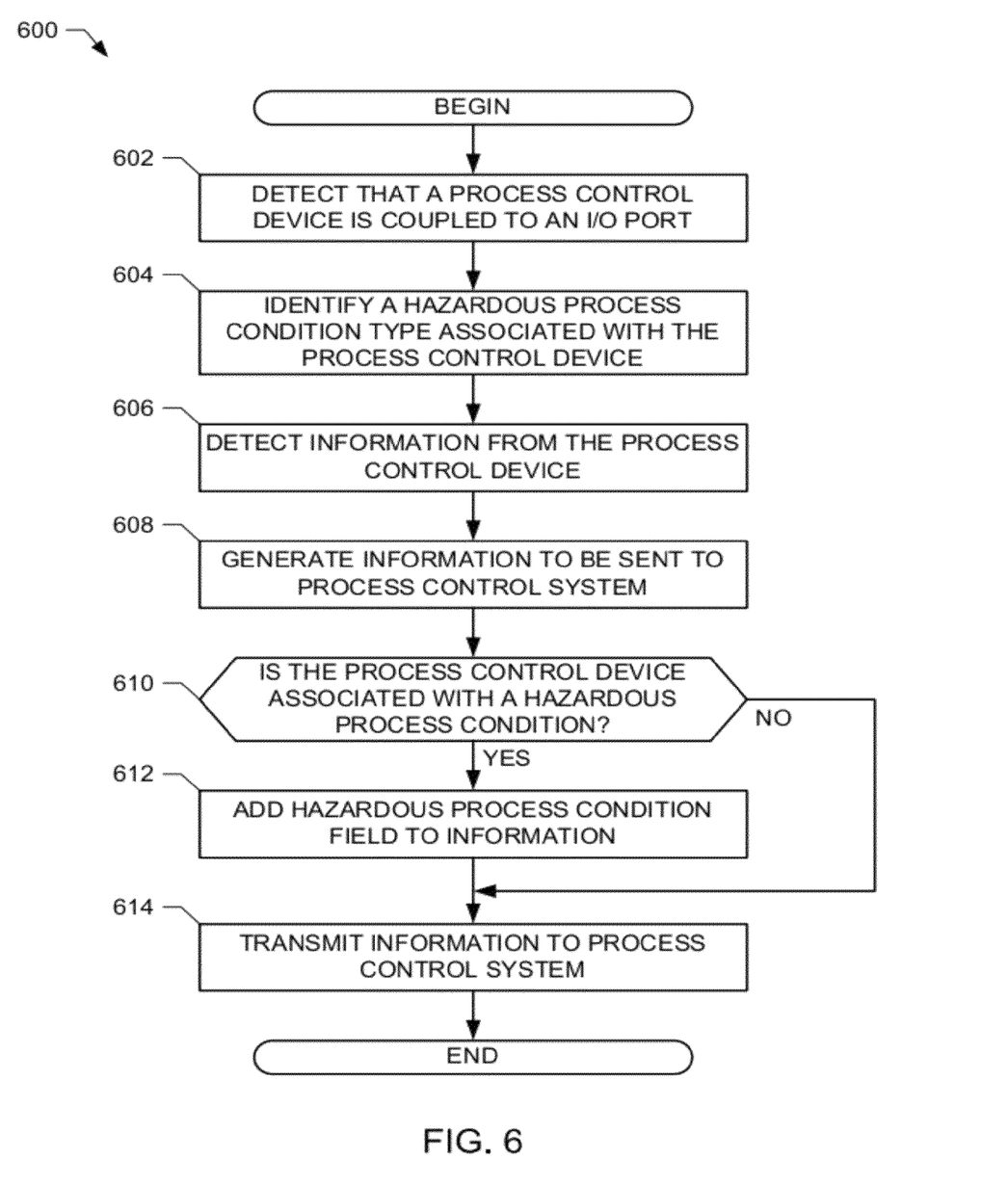
FIG. 6 is a flowchart illustrating an example method to identify a hazardous process condition associated with a process control device.

FIG. 6 is a flowchart illustrating an example method 600 to identify a hazardous process condition type associated with a process control device (e.g., the example field device 112a of FIG. 1). The example method 600 may be performed by the I/O card 132 of FIG. 3 to identify and to inform a process control system (e.g., the process control system 100 of FIG. 1) that the field devices 112a-112c are associated with a potentially explosive atmosphere and are intrinsically safe. For clarity, the example method 600 will be described with reference to the example I/O card 132 and the example field device 112a of FIG. 2. However, the description of the method 600 is equally applicable to other types of I/O cards 134, other types of hazardous process conditions, and/or other process control devices 112b, 112c, and 116a-116c.

The example method 600 begins by detecting (e.g., via the hazardous process condition detector 208) that a process control device (e.g., the field device 112a) is coupled to an I/O port (e.g., the termination 204a) (block 602). The hazardous process condition detector 208 further detects a hazardous process condition type (e.g., explosive, radioactive, biological, etc.) associated with the field device 112a (block 604). For example, the hazardous process condition detector 208 may detect whether the field device 112a is an intrinsically safe device via the presence or absence of an IS barrier 204a. The I/O processor 206 detects information (e.g., a data signal) from the field device 112a (block 606). The I/O processor 208 then generates a data signal or other information (e.g., a data packet 300) to be sent to a process control system (e.g., a workstation 102 and 103, a controller 104, etc., of the process control system 100) (block 608).

Hazardous process condition types may be identified directly or indirectly. For example, a chemical sensor may identify a dangerous atmospheric concentration of a particular chemical from which the hazardous process condition detector 208 may directly identify the hazardous process condition type associated with the field device 112a. In another example, a property (e.g., an intrinsic safety property) of the field device or system (e.g., presence of an IS barrier) may give rise to an indirect identification of a hazardous process condition type by deducing the hazardous process condition type from the IS property of the field device 112a.

Based on whether the field device 112a has an associated hazardous process condition, the hazardous process condition detector 208 identifies the hazardous process condition type (e.g., an IS property corresponding to a potentially explosive atmosphere) of the field device 112a to the I/O processor 206 and/or the hazardous condition signal modifier 210. If the field device 112a has an associated hazardous process condition (e.g., intrinsically safe) (block 610), the example hazardous condition signal modifier 210 instructs the I/O processor 206 to add a hazardous process condition field 308 to the data packet 300 (block 612). If the field device 112a does not have an associated hazardous process condition (block 610), or after the hazardous process condition field 308 is added to the information (block 612), the example I/O processor 206 transmits the information to the process control system 100 (e.g., via the I/O controller interface 212 and/or the LAN 106) (block 614). The example method 600 may then end, or may iterate to block 602 to detect another process control device (e.g., the field device 112b) and/or to block 606 to detect another signal from the field device 112a. After the hazardous process condition detector 208 identifies example field device 112a as intrinsically safe (or as associated with some other hazardous process condition), the I/O processor 206 and/or the hazardous condition signal modifier 210 may maintain the identification until the field device 112a is decoupled from the termination 204a.

Figure 7:
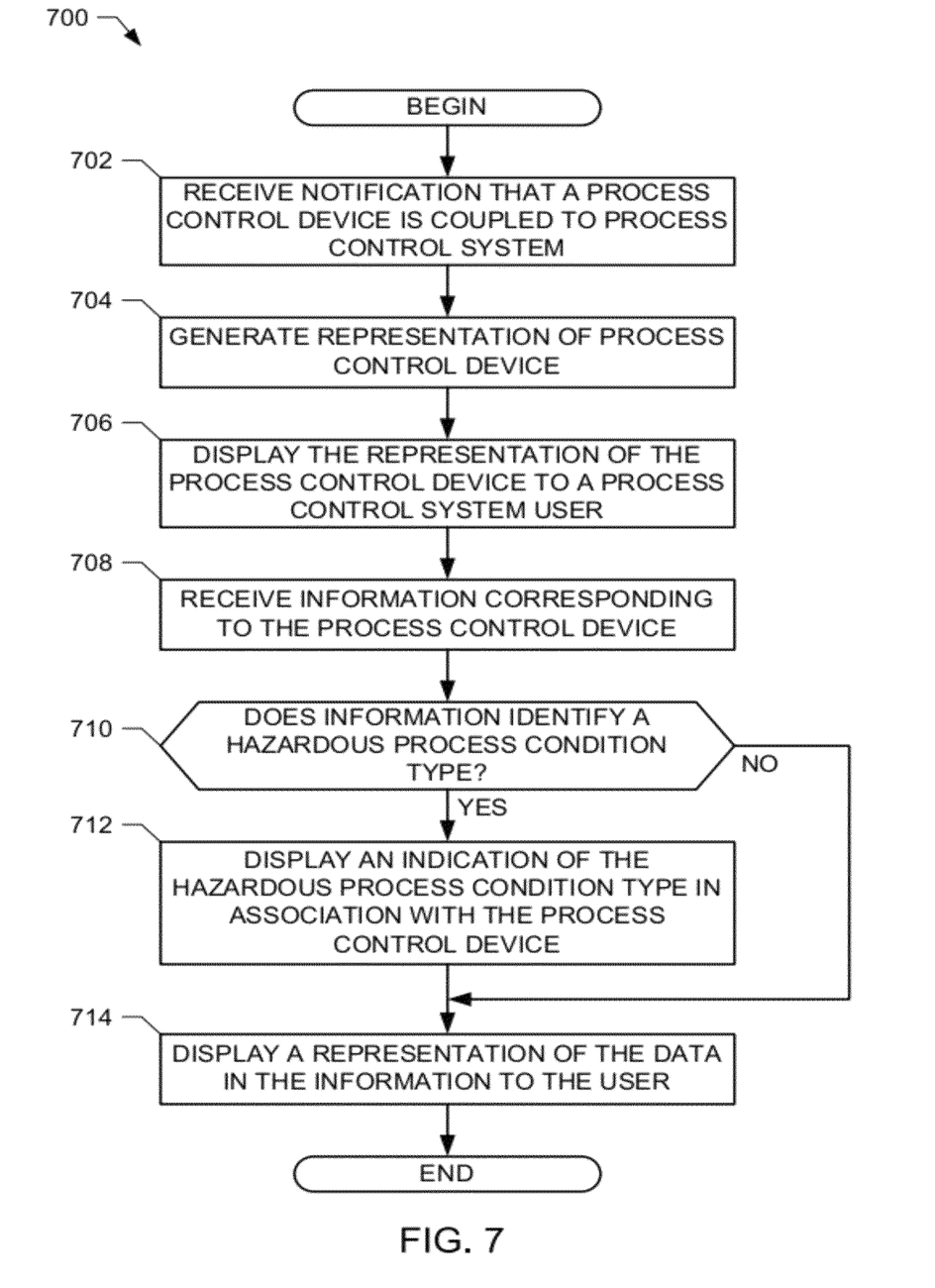
FIG. 7 is a flowchart illustrating an example method to identify a hazardous process condition associated with a process control device to a process control system user.

FIG. 7 is a flowchart illustrating an example method 700 to identify a hazardous process condition associated with a process control device (e.g., the field device 112a) to a process control system user. In contrast to the example method 600 of FIG. 6, the method 700 may be executed by, for example, the workstations 102 and 103 and/or the hazardous process condition identifiers 142 and 143 of FIG. 1. The method 700 will be described using the example field device 112a, the example workstation 102, and the example hazardous process condition identifier 142 of FIG. 1. However, the following description is equally applicable to the example field devices 112b, 112c, and 116a-116c, the example workstation 103, and/or the example hazardous process condition identifier 143.

The example method 700 begins by receiving (e.g., at the workstation 102) a notification that a process control device (e.g., the field device 112a) is coupled to the process control system 100 (block 702). The workstation 102 generates a representation of the field device 112a (block 704). The representation may include, for example, an instantiation of a known device type and a device identification corresponding to the DEVICE ID field in a data packet (e.g., the data packet 300 of FIG. 3). The workstation 102 then displays (e.g., via the operator interface 400 of FIG. 4) the representation of the field device 112a to a process control system user (e.g., an operator, maintenance personnel, etc.) (block 706).

The example workstation 102 receives information (e.g., the data packet 300) corresponding to the field device 112a (block 708). The workstation 102 may determine that the data packet 300 corresponds to the field device 112a by, for example, comparing the DEVICE ID 302 of the data packet 300 to the device identification of the generated representation. The workstation 102 then determines (e.g., via the hazardous process condition identifier 142) whether the information identifies the field device 112a as having an associated hazardous process condition type (e.g., whether the field device 112a is an IS device) (block 710). If the information has an associated hazardous process condition type (e.g., the field device 112a is an IS device) (block 710), the workstation 102 displays an indication (e.g., the highlight 408 of FIG. 4) to the user that the field device 112a has an associated hazardous process condition type (block 712). In some examples, the indication is displayed proximate to the displayed representation of the field device 112a to increase the likelihood that a user associates the intrinsic safety indication 408 with the field device 112a. In examples where the HPC field 308 includes an identifier of the type of hazardous location, the operator interface 400 may additionally display or make available for display the classification of the hazardous location. Additionally, the indication 408 may stick with the displayed representation of the field device 112a until the field device 112a is decoupled from the system 100 of FIG. 1 and/or beyond.

If the information does not identify the field device 112a as having an associated hazardous process condition type (block 710), or after the workstation displays the indication (block 712), the example workstation 102 displays a representation of the data in the information to the user (block 714). For example, the workstation 102 may display a measurement taken by the field device 112a proximate to the representation of the field device 112a. The example method 700 may then end.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to identify a hazardous process control type associated with a process control device, comprising:
    automatically detecting that the process control device is coupled to a port on a controller via an intrinsically safe barrier circuit;
    detecting information associated with the process control device via the port, wherein the information associated with the device is based on the intrinsically safe barrier circuit;
    identifying the hazardous process condition type of the process control device based on the detected information;
    in response to identifying the hazardous process condition type, modifying a communication to include a data field indicating that the process control device is located in an area having the identified hazardous process condition type; and
    sending the communication including the data field to a computing device to cause a display to include a visual indication of the identified hazardous process condition type in association with the process control device and based on a presence of the data field.

2. A method as defined in claim 1, wherein the hazardous process condition type comprises at least one of a potentially explosive condition, a radioactive condition, a biological hazard condition, or a chemical hazard condition.

3. A method as defined in claim 1, wherein the controller is an input/output controller.

4. A method as defined in claim 3, wherein the port is an input/output port.

5. A method as defined in claim 1, wherein the computing device is an operator station of a process control system.

6. A method as defined in claim 1, wherein the communication sent to the computing device includes a hazardous process condition property.

7. A method as defined in claim 1, wherein the communication sent to the computing device includes a hazardous location classification.

8. A method as defined in claim 1, further comprising sending a second communication not including the data field to the computing device to cause the display to include a visual indication that a second process control device is not associated with the identified hazardous process condition type.

9. A process control apparatus, comprising:
    an input/output (I/O) port;
    a process control device detector coupled to the I/O port to detect that a process control device is coupled to the I/O port;
    an intrinsically safe barrier circuit coupled to the I/O port;
    an I/O processor to communicate with a process control system based on information received from the process control device, wherein the information is based on the intrinsically safe barrier circuit;
    a hazardous process condition detector to determine that the process control device is located in an area associated with a hazardous process condition type; and
    a hazardous process condition signal modifier to modify a communication between the I/O processor and the process control system to include a data field indicating that the process control device is located in the area associated with the hazardous process condition type, the data field to cause a display to include a visual indication of the identified hazardous process condition type in association with the process control device.

10. A process control apparatus as defined in claim 9, wherein the hazardous process condition type comprises at least one of a potentially explosive condition, a radioactive condition, a biological hazard condition, or a chemical hazard condition.

11. A process control apparatus as defined in claim 9, wherein the process control device detector is to detect that an intrinsically safe process control device is coupled to the I/O port in response to detecting that the process control device is coupled to the intrinsic safety barrier.

12. A process control apparatus as defined in claim 9, wherein the hazardous process condition signal modifier is to add a hazardous process condition property to the communication.

13. A process control apparatus as defined in claim 9, wherein the I/O processor transmits the communication to an operator control system to notify a user that the device is intrinsically safe.

14. A tangible non-transitory computer readable storage medium comprising computer readable instructions which, when executed, cause a computer to at least:
    detect that a process control device is coupled to a port on a controller via an intrinsically safe barrier circuit;
    detect information associated with the process control device via the port;
    identify a hazardous process condition type of the process control device based on the detected information, wherein the information associated with the device is based on the intrinsically safe barrier circuit;
    in response to identifying the hazardous process condition type, modify a communication to include a data field indicating that the process control device is located in an area having the identified hazardous process condition type; and
    send the communication including the data field to a computing device to cause a display to include a visual indication of the identified hazardous process condition type in association with the process control device and based on a presence of the data field.

15. A storage medium as defined in claim 14, wherein the hazardous process condition type comprises at least one of a potentially explosive condition, a radioactive condition, a biological hazard condition, or a chemical hazard condition.

16. A storage medium as defined in claim 14, wherein the information sent to the computing device includes an intrinsically safe device property.

\* \* \* \* \*